US 8,539,054 B2

(12) United States Patent
Huang et al.

(10) Patent No.: US 8,539,054 B2
(45) Date of Patent: Sep. 17, 2013

(54) REMOTE INTERFACE APPARATUS, CONTROL SYSTEM, AND THE METHOD THEREOF

(75) Inventors: Yung Shun Huang, Tainan (TW); Jin Neng Wu, Yunlin County (TW); Ping Yu Chen, Tainan County (TW); Nien Chin Wu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 716 days.

(21) Appl. No.: 12/178,322

(22) Filed: Jul. 23, 2008

(65) Prior Publication Data
US 2009/0132737 A1 May 21, 2009

(30) Foreign Application Priority Data
Nov. 21, 2007 (TW) ................................ 96144011 A

(51) Int. Cl.
*G06F 15/177* (2006.01)

(52) U.S. Cl.
USPC ........... 709/222; 709/220; 709/221; 709/250; 370/466; 370/401

(58) Field of Classification Search
USPC ......................................... 709/220–222, 250
See application file for complete search history.

(56) References Cited

U.S. PATENT DOCUMENTS

| 6,751,671 | B1 * | 6/2004 | Urien | 709/229 |
|---|---|---|---|---|
| 6,779,004 | B1 * | 8/2004 | Zintel | 709/227 |
| 7,023,863 | B1 * | 4/2006 | Naudus et al. | 370/401 |
| 7,171,194 | B2 * | 1/2007 | Marsico et al. | 455/418 |
| 7,171,475 | B2 | 1/2007 | Weisman et al. | |
| 7,293,117 | B2 * | 11/2007 | Ohta | 710/10 |
| 2002/0112058 | A1 | 8/2002 | Weisman et al. | |
| 2003/0093503 | A1 * | 5/2003 | Yamaki et al. | 709/220 |
| 2003/0108069 | A1 * | 6/2003 | Yamada | 370/535 |
| 2003/0182456 | A1 * | 9/2003 | Lin et al. | 709/250 |
| 2003/0185233 | A1 * | 10/2003 | Ji et al. | 370/466 |
| 2004/0064536 | A1 * | 4/2004 | Held et al. | 709/222 |
| 2004/0085961 | A1 * | 5/2004 | Coffell et al. | 370/392 |

(Continued)

FOREIGN PATENT DOCUMENTS

| CN | 1969503 A | 5/2007 |
|---|---|---|
| JP | 2003-008610 | 1/2003 |

(Continued)

OTHER PUBLICATIONS

Japanese Office Action dated Jan. 25, 2011 for 2008-247731, which is a corresponding Japanese application, that cites 2003-008610.

(Continued)

*Primary Examiner* — Wing F Chan
*Assistant Examiner* — Razu Miah
(74) *Attorney, Agent, or Firm* — WPAT, P.C.; Anthony King

(57) ABSTRACT

A remote interface apparatus comprises a network interface, a peripheral device interface, an interface-providing mechanism and a network address setting mechanism. The network interface is configured to communicate with a remote host. The peripheral device interface is configured to connect to a peripheral device. The interface-providing mechanism cooperates with the network interface to transfer the peripheral device interface into a remote peripheral device connection port of the host. The network address setting mechanism is configured to automatically obtain a network address upon a connection to the network, and to broadcast information of the peripheral device interface.

25 Claims, 10 Drawing Sheets

(56) References Cited

U.S. PATENT DOCUMENTS

| | | | |
|---|---|---|---|
| 2004/0260404 A1 | 12/2004 | Russell et al. | |
| 2004/0260887 A1* | 12/2004 | Landin et al. | 711/145 |
| 2005/0038934 A1* | 2/2005 | Gotze et al. | 710/15 |
| 2005/0097191 A1* | 5/2005 | Yamaki et al. | 709/219 |
| 2005/0097214 A1* | 5/2005 | Chen et al. | 709/231 |
| 2007/0022218 A1* | 1/2007 | Szolyga et al. | 709/250 |
| 2007/0195729 A1* | 8/2007 | Li et al. | 370/328 |
| 2008/0069121 A1 | 3/2008 | Adamson | |
| 2008/0222326 A1* | 9/2008 | Liu et al. | 710/62 |
| 2008/0229089 A1* | 9/2008 | Assouad et al. | 713/2 |
| 2010/0240980 A1* | 9/2010 | Zhu et al. | 600/372 |

FOREIGN PATENT DOCUMENTS

| | | |
|---|---|---|
| TW | 200509596 | 3/2005 |
| TW | 200623714 | 7/2006 |
| WO | 2007032847 | 3/2007 |

OTHER PUBLICATIONS

English Abstracts of CN1969503A.

Desbonnet, Joe et al., System Architecture and Implementation of a CEBus/Internet Gateway, IEEE Transactions on Consumer Electronics, vol. 43, No. 4, Nov. 1997, 1057-1062.

Corcoran, Peter M., Mapping Home-Network Appliances to TCP/IP Sockets Using a Three-Tiered Home Gateway Architecture, IEEE Transactions on Consumer Electronics, vol. 44, No. 3, Aug. 1998, 729-736.

Corcoran, Peter M. et al., Browser-Style Interfaces to a Home Automation Network, IEEE Transactions on Consumer Electronics, vol. 43, No. 4, Nov. 1997, 1063-1069.

* cited by examiner

REMOTE INTERFACE APPARATUS, CONTROL SYSTEM, AND THE METHOD THEREOF

BACKGROUND OF THE INVENTION

1. Field of the Invention

The present invention relates to a remote device connection and control system, and more particularly, to a remote peripheral device connection and control system.

2. Description of the Related Art

For many kinds of in-house services (such as security, health care or automation), neighborhood service, facility service, factory automation or checkout automation in supermarkets, it is necessary to provide services through connection ports of a host, e.g., RS232, IrDA, USB, Zigbee or Bluetooth, or otherwise connect to the device of the host. A common requirement for such services is communication connections and control of remote devices.

An important, related issue concerns expanding the number and kinds of connection ports of the peripheral devices. To date, the superior products in the market are separated into two types. The first one uses network-based interface adapter/gateway technology, which utilizes TCP/IP socket programs in the host and TCP/IP socket programs in the interface adapter/gateway to extend the original peripheral device interface driver to the network. The second uses UPnP device adaptor technology, which is the mainstream technology for digital home use. At the host end, by adding the technology of UPnP control point communication stack, the application program of the host is capable of using the function of the UPnP control point. At the device end, a UPnP device adapter capable of using a UPnP control point communication stack is used to transform original devices into UPnP devices. Therefore, the host can communicate with the device through UPnP communications protocol to achieve functions, e.g., automatic configuration, discovery, description, device service description, remote procedure call or event reply, etc.

To date, the available network-type interface adapter/gateway devices execute only interface transformation, such as transformation between TCP/IP and RS232 or between TCP/IP and USB. The network addresses of such products must be set manually, and used at fixed TCP/UDP ports. Furthermore, there is no description function between these products and the host, nor is there any status report.

U.S. Pat. Nos. 6,779,004 and 7,171,475 disclose a UPnP device structure and interface. Although the device is more user-friendly, there is a trade-off of high hardware and software costs. Another disadvantage is limited compatibility with other devices.

SUMMARY OF THE INVENTION

The present invention proposes a remote interface apparatus, which comprises a network interface, a peripheral device interface, an interface-providing mechanism and a network address setting mechanism. The network interface is configured to communicate with a remote host. The peripheral device interface is configured to connect to a peripheral device. The interface-providing mechanism cooperates with the network interface to transfer the peripheral device interface into a remote peripheral device connection port of the host. The network address setting mechanism is configured to automatically obtain a network address upon a connection to the network, and to broadcast information of the peripheral device interface.

The present invention proposes a remote interface system, which comprises a host and a remote interface apparatus. The host comprises a virtual peripheral device interface object, wherein the virtual peripheral device object receives peripheral device driver instructions and transfers the driver instructions of the peripheral device in a network protocol to the remote interface apparatus, and later the virtual peripheral device interface object receives an execution result of the remote interface apparatus and transfers the result to the application.

The method for using a remote interface system comprises the steps of: automatically obtaining a network address by a remote interface apparatus; broadcasting device interface services provided by the remote interface apparatus; setting a connection between the remote interface apparatus and a host; automatically installing a driver for a peripheral device connected to the remote interface apparatus; and setting a virtual peripheral device interface object corresponding to the peripheral device by the host.

BRIEF DESCRIPTION OF THE DRAWINGS

The invention will be described according to the appended drawings in which.

PREFERRED EMBODIMENT OF THE PRESENT INVENTION

Figure 1:
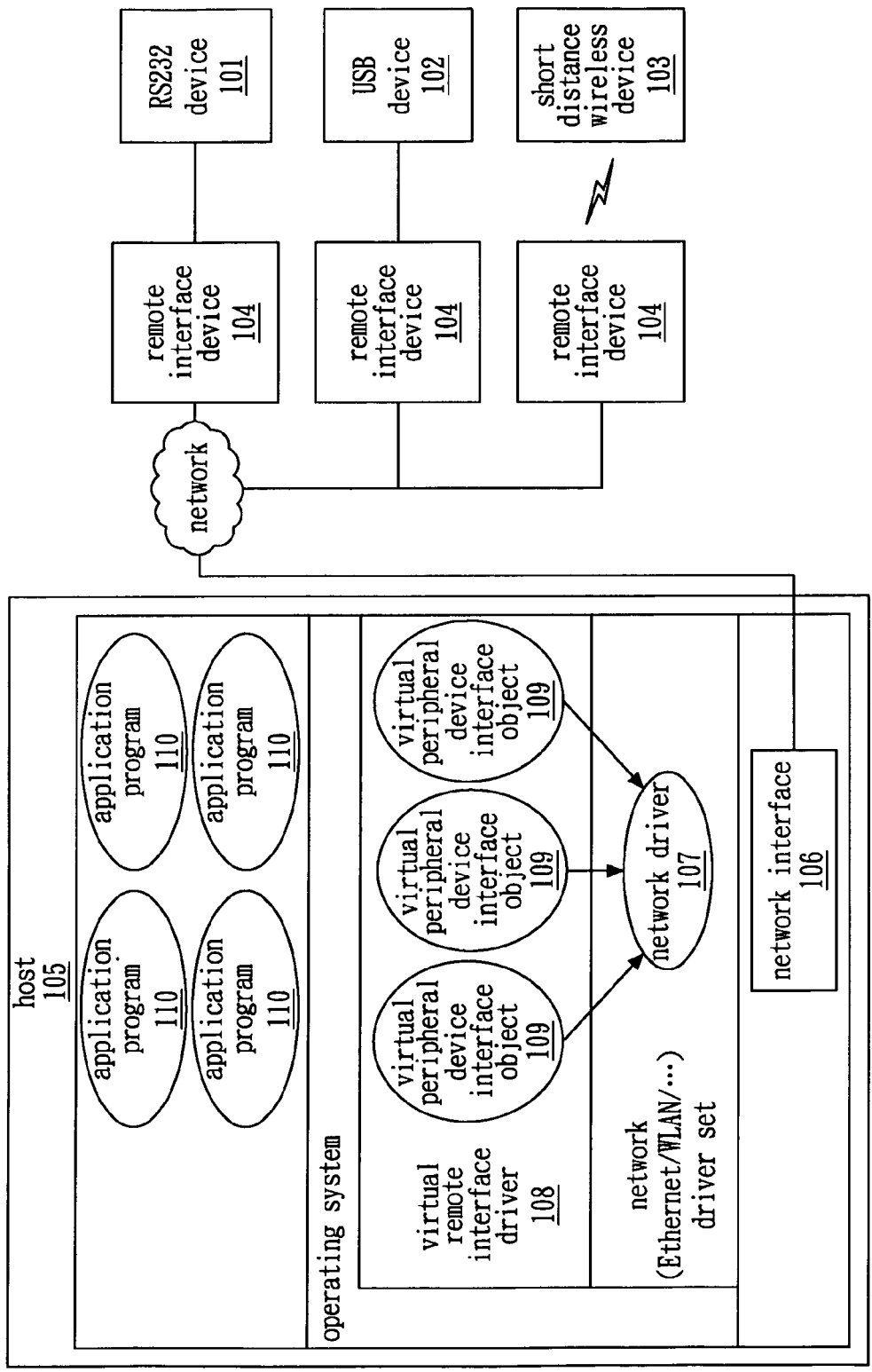
FIG. 1 shows a remote interface device according to one embodiment of the present invention.

FIG. 1 shows a remote interface device according to one embodiment of the present invention. An RS232 device 101, a USB device 102 and a short distance wireless device 103 such as Bluetooth/Zigbee/IrDA are connected to a remote interface device 104. The remote interface device 104 provides a host of the network with a peripheral device interface through the network. Upon the connection of the remote interface device 104, it will obtain a network address from DHCP or automatically set and test to obtain a network address with an automatic IP algorithm through a network address setting mechanism, and then broadcast in the network through a broadcast mechanism indicating the types of peripheral device interfaces the remote interface device 104 owns so that the hosts in the network can know what kinds of peripheral device interfaces it can use to connect to remote peripheral devices. After the host receives the notification about peripheral device interface services or locates the peripheral device interface through a interface-providing mechanism, the host will conduct related setup of remote peripheral devices so that the peripheral device interface becomes a virtual peripheral device connection port of the host. For the application program of the host, the virtual peripheral device connection port performs the same function as other connection ports of the host. Through such service, the host knows what kind of connection ports in the remote end can be used, or whether there are enough adequate connection ports to use. When the user at the host end locates an adequate virtual peripheral device connection port, the peripheral devices can be set to connect to the virtual peripheral device connection port. The remote interface device 104 supports specific protocols, including communication formats for the UPnP communication protocol. For example, when the host 105 utilizes a discovery protocol to search for services provided by the remote interface device 104, the remote interface device 104 will allow the host 105 to use GET instructions of HTTP to obtain the peripheral device interface or device describer document thereon. When the peripheral device installs the remote interface device 104, the host 105 sequentially sets up virtual peripheral device interface objects 109 corresponding to the peripheral device in its virtual remote interface driver 108. The application program 110 of the host 105 controls the connection over the peripheral devices through the virtual peripheral device interface objects 109. For example, if an application program of an RS232 device 101 gives instructions to the RS232 device, the instructions will be transmitted to the network driver 107 through the virtual peripheral device interface objects 109 of the RS232 device, and by the network interface 106 to transmit to the remote interface device 104 attached to the RS232 device. After the remote interface device 104 receives instructions, the remote interface device 104 provides a mechanism for transferring the instructions in a network protocol to the driver of the RS232 device 101. After the RS232 device 101 completes the necessary execution, the remote interface device 104 provides another mechanism for transferring the result to the network interface 106 of the host in the network protocol through a network function of the remote interface device 104, going through the network driver 107 and virtual peripheral device interface objects 109, and reaching the application program 110.

Figure 2:
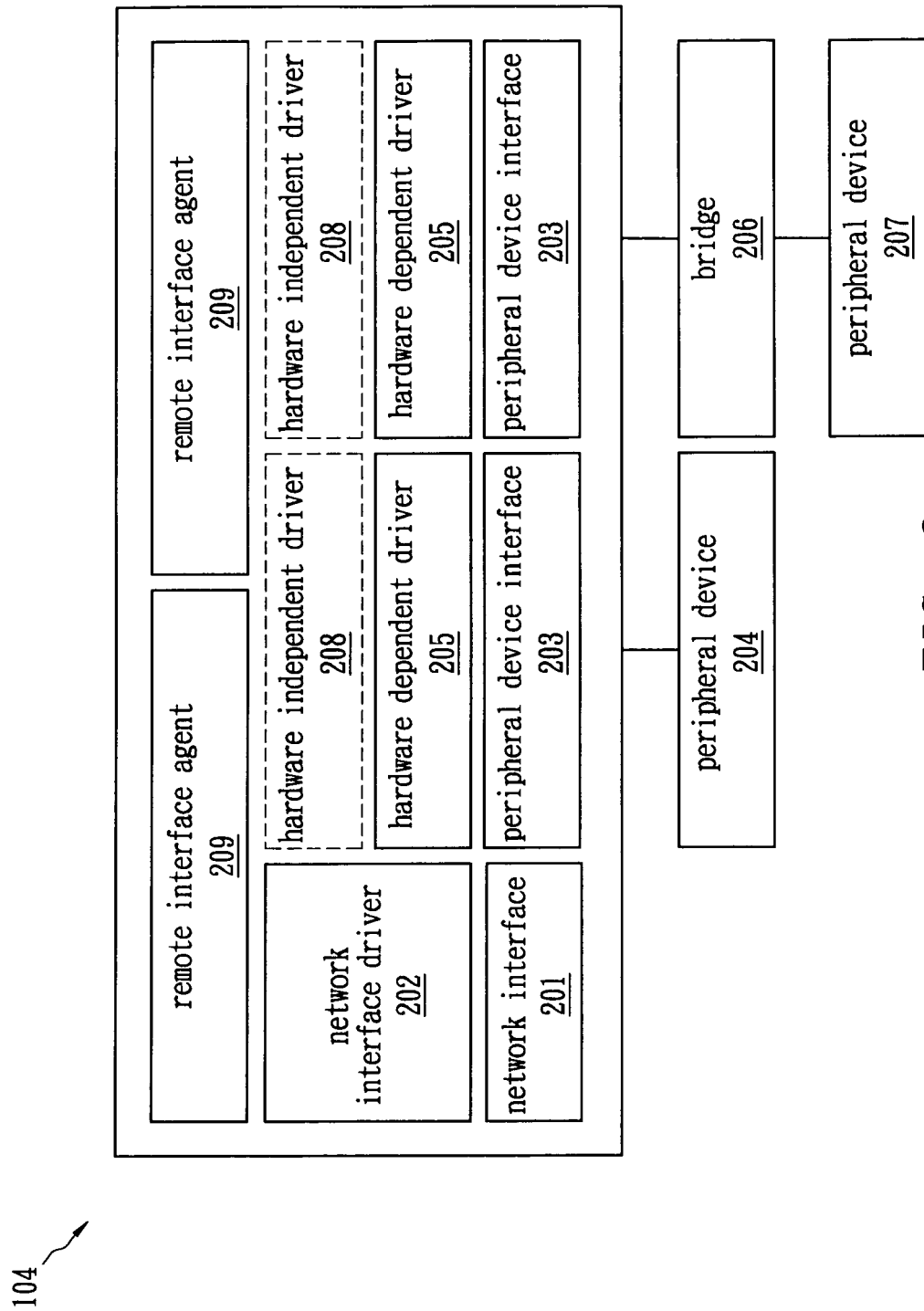
FIG. 2 shows a software structure of a remote interface device according to one embodiment of the present invention.

FIG. 2 shows a software structure of a remote interface device according to one embodiment of the present invention. Referring primarily to FIG. 2, but also referring to FIG. 1, the primary purpose of the remote interface device 104 is to provide peripheral device interface to the host 105 of the network for controlling remote peripheral devices. Therefore, the main part of the remote interface device 104 is communication hardware and software between the device and the host and between the device and the peripheral device. The remote interface device 104 further includes necessary hardware for operations, such as processor and memory. The processor includes microprocessor or microcontroller, such as Intel, AMD, IBM, Motorola, ARM, VIA, etc. The memory includes volatile memory or non-volatile memory, such as DRAM, Flash, EPROM or ROM, for storing execution program or data. The network interface 201 and network interface driver 202 form the communication basis between the remote interface device 104 and the host 105. The network interface 201 includes wired or wireless network interface. The peripheral device interface 203 provides the connection port of the peripheral device 204. Such connection port includes a wired network interface, such as RS232, RS485, RS422, USB, IEEE 1394 and Firewire, or wireless interface, such as Bluetooth, Zigbee and IrDA. The remote interface device 104 includes a hardware dependent driver 205 related to the peripheral device 204, and uses the hardware dependent driver 205 to drive the corresponding peripheral device 204. The peripheral device interface 203 can be connected to a peripheral device 207 through a bridge 206. The layer above the hardware dependent driver 205 may include a hardware independent driver 208, which can be placed in the host 105 as well. If it is placed in the host 105, the application program of the host 105 will communicate directly with the hardware independent driver 208, which further forwards the instruction to the device through the network communication. If the hardware independent driver 208 is installed in the device, then the application program of the host will first transfer the instruction to the device through network communication, going through the hardware independent driver 208, and reaching the hardware dependent driver 205. The remote interface agent 209 offers the function of automatic addressing and broadcasting so that the peripheral device interface 203 is able to be located by the host 105 and the communication connection between the peripheral devices 204 and the host 105 is established later. After the device is connected to the network, the remote interface agent 209 broadcasts in the network information indicating which type of peripheral device interface message is provided by the device to the host 105 of the network. If the device owns the capability of UPnP communication capability, the remote interface agent 209 is not only capable of automatic setup, such as obtaining the network address and self-configuration, but also capable of discovering, describing and controlling the function of UPnP. Aside from the communication function, the remote interface agent 209 is also responsible for transferring peripheral device driving instructions in a network protocol to the driver of the peripheral device. Subsequently, the executing result of the peripheral device is converted in the network protocol and forwarded back to the host 105.

Figure 3:
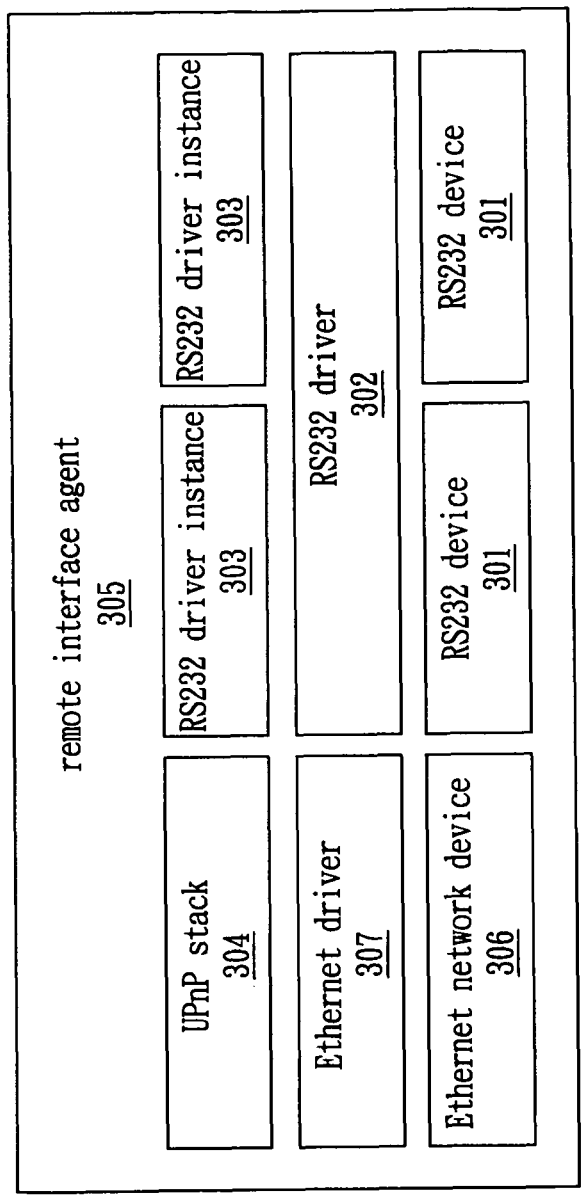
FIG. 3 shows a remote interface device according to one embodiment of the present invention.

FIG. 3 shows a remote interface device according to one embodiment of the present invention. An RS232 device 301 is connected to a peripheral device with an RS232 interface. This embodiment uses two connection ports as an example, but this device can be designed to include multiple connection ports regardless of whether their connection ports are in the same communication protocol. The RS232 remote device includes an RS232 driver 302 which the RS232 remote device uses to control all RS232 peripheral devices 301. Each RS232 device 301 owns a corresponding RS232 driver instance 303, which together with UPnP stack is included in the remote interface agent 305. The RS232 remote device is connected to an Ethernet network driver, host or other remote interface devices through an Ethernet network device 306.

Figure 4:
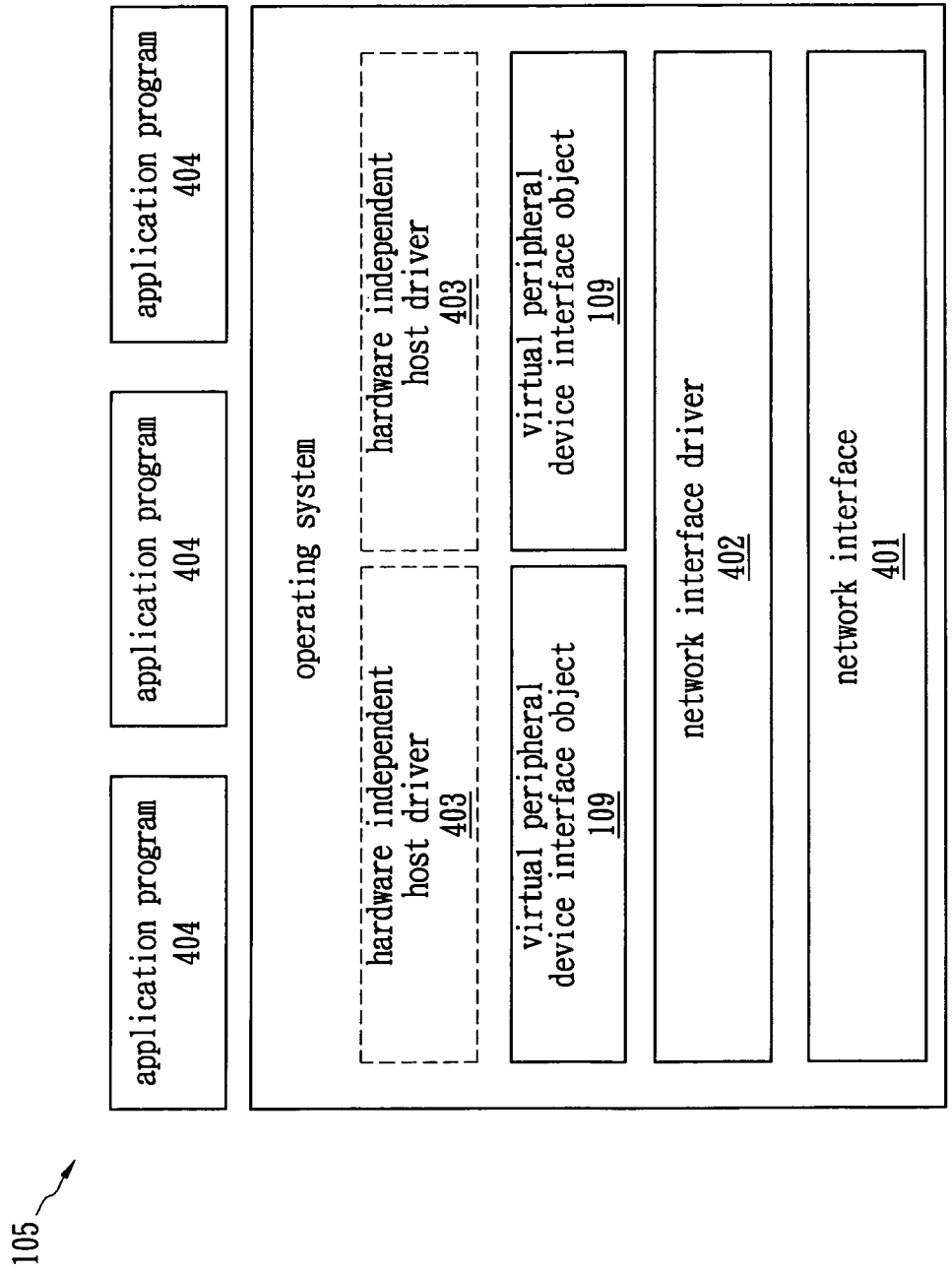
FIG. 4 shows a hint diagram of the host of the remote interface system.

FIG. 4 shows a hint diagram of the host of the remote interface system. Referring primarily to FIG. 4, but also referring to FIG. 1, the host 105 controls some peripheral devices through a network interface 401 and a network interface driver 402. After finding serviceable peripheral devices and their interfaces in the network, the host 105 will set up a virtual peripheral device interface object 109 of the peripheral device and hardware independent host driver 403 in the system. The host 105 uses the virtual peripheral device interface object 109 and hardware independent host driver 403 to control the peripheral devices. In addition, in accordance with the design and user demands, the hardware independent host driver 403 can be designed inside the remote interface device 104. The user can search for serviceable peripheral devices in the network through an application program 404, and uses the remote interface device 104 through the application program 404 to provide description information related to the peripheral devices and understand what kind of services the peripheral devices can provide. Furthermore, by the virtual peripheral device interface object 109 and hardware independent host driver 403, the peripheral devices can be controlled through the remote interface device 104.

Figure 5:
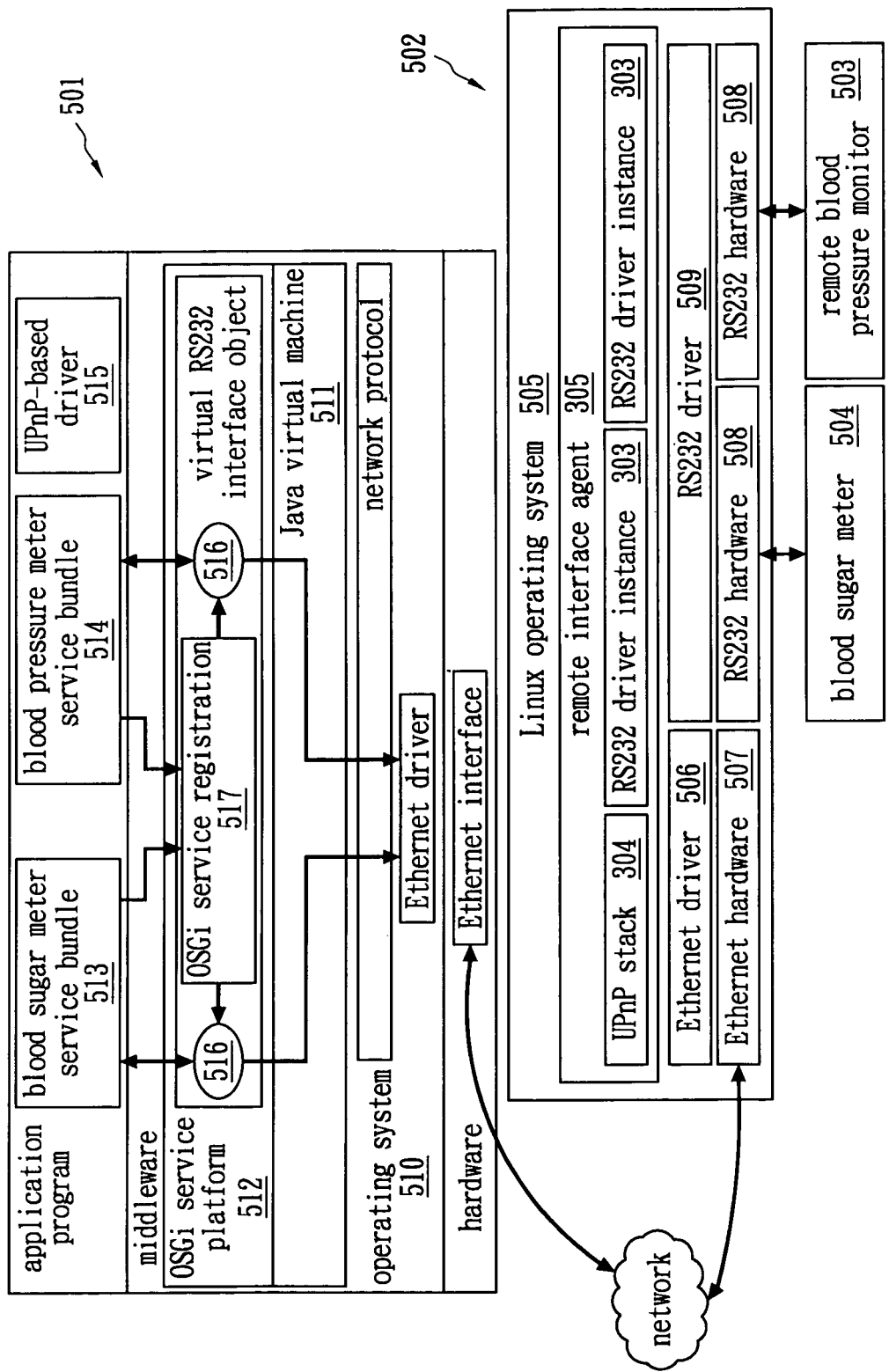
FIG. 5 shows a remote interface system according to one embodiment of the present invention.

FIG. 5 shows a remote interface system according to one embodiment of the present invention. This embodiment includes an OSGi (Open Service Gateway Initiatives Service Platform)/X86 host 501, a Linux/ARM 9 RS232 remote interface device 502, a blood pressure monitor 503 with RS232 interface and a blood sugar meter 504 with RS232 interface. The host 501 uses UPnP communication protocol to collect and control physiological observed data by the remote blood pressure monitor 503 and the blood sugar meter 504 through UPnP-based RS232 remote interface device 502. The RS232 remote interface device 502 uses a Linux operating system 505, whose driver includes an Ethernet driver 506 for driving Ethernet hardware 507 and an RS232 driver 509 for driving RS232 hardware 508. The remote interface agent 305 includes a UPnP stack 304 and two RS232 driver instances 303. The remote interface agent 305 implements UPnP-related mechanisms, including addressing mechanism, naming mechanism, advertising mechanism, description mechanism, invoking mechanism and event mechanism. The remote interface agent 305 can implement the invoking mechanism to execute a request against a status information service, and an event will be created by the event mechanism when there is a change in the RS232 remote interface device 502. The remote interface agent 305 uses UPnP stack 304 to complete an auto-configuration of the network addressing and connection with the OSGi host 501. The above mechanism includes UPnP-related advertising mechanism, discovery mechanism, and device identification or device classification mechanism of the RS232 remote interface device 502. The remote interface agent 305 will physically transfer two RS232 drivers to virtual interfaces in the network, and each will own respective serial numbers. Before these two RS232 drivers are physically transferred into two UPnP devices in the network, the relationship between the functions provided by the RS232 driver and a UPnP SOAP message is defined first. When the remote interface agent 305 receives UPnP messages from the OSGi host 501, RS232 virtual peripheral device interface objects and functions corresponding to the messages are located first, then the function is requested to execute the instructions. After the instructions are executed, the result returns to the application program of the OSGi host 501 along an opposite direction.

Upon establishment of the connection between the OSGi host 501 and the remote RS232 devices, the event notice of the remote RS232 device may be subscribed. The remote RS232 devices will issue event notices in accordance with subscription status to report its status to the OSGi host 501.

In this embodiment, the operating system 510 of the OSGi host 501 is Linux, and the software includes Java virtual machine 511 and OSGi service platform 512. The application software layer includes blood sugar meter service bundle 513, blood pressure monitor service bundle 514 and UPnP-based driver 515, wherein the UPnP-based driver 515 contains UPnP control point stack.

The blood pressure monitor and/or the blood sugar meter service bundle searches virtual RS232 interface object 516 through the help of an OSGi service registration 517. After the corresponding virtual RS23 interface object 516 is located, the application program must call Assign( ) function to obtain the user right. After the user right is obtained, the send(GET_DEVICE_ID_COMMAND) function is called to obtain a device identifier for health care of the RS232 remote interface device 502 so as to ensure the correctness of collected data. After the correctness is confirmed, the command to collect data of the blood pressure monitor and/or the blood sugar meter is issued, and then the data is collected into the OSGi host 501. After the application program completes its job, it is necessary to call a release function to release the user right of the virtual RS232 interface object 516.

After the RS232 interface object 516 receives the command from the application program, the virtual RS232 interface object 516 uses the UPnP stack of UPnP-based driver to transfer the command into corresponding SOAP messages, and then delivers these messages to an RS232 remote interface device 502. The RS232 remote interface device 502 calls the RS232 driver and executes the command. After the command is executed, the result returns to the application program of the OSGi host 501 along an opposite direction.

Figure 6:
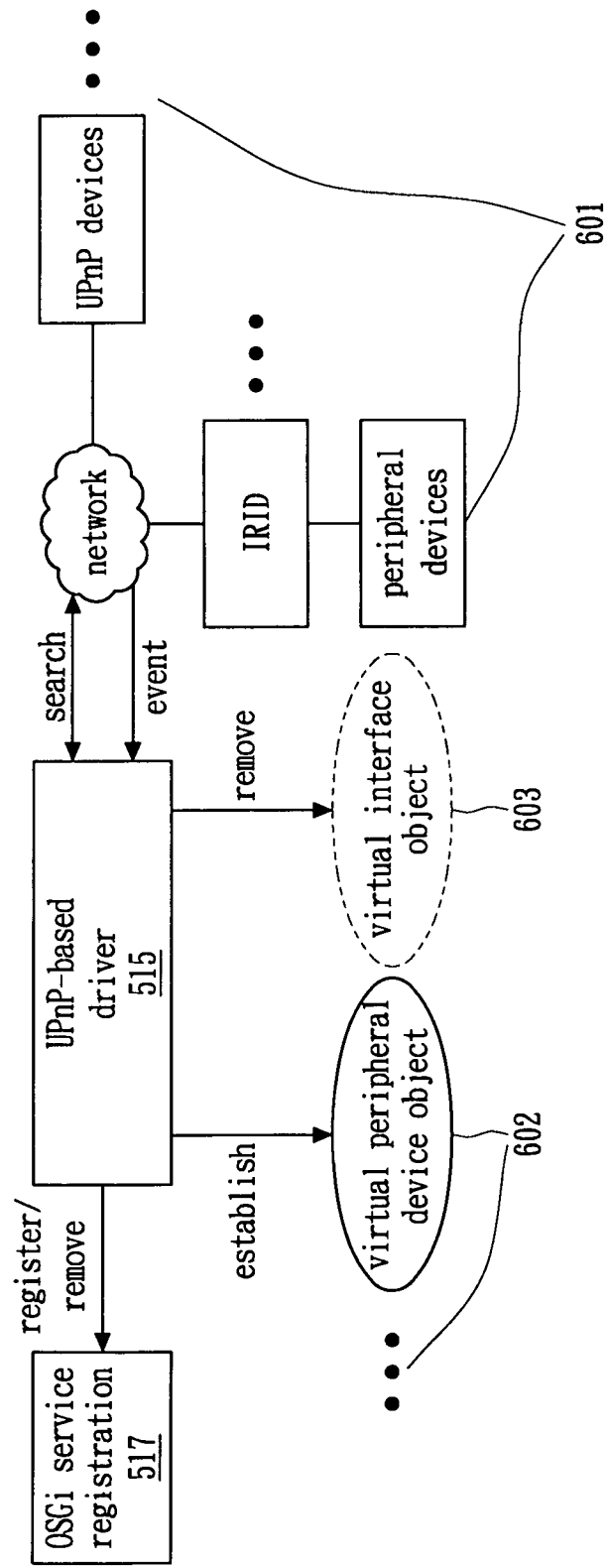
FIG. 6 shows a host control of the remote interface system according to one embodiment of the present invention.

FIG. 6 shows a host control of the remote interface system according to one embodiment of the present invention. The UPnP-based driver 515 collects all UPnP devices 601 in the network. Subsequently, the relation between the well-defined driver function and the UPnP SOAP is sought so as to generate a virtual peripheral device object 602. Finally, the located UPnP devices are registered into the OSGi service registry 517 so as to offer a basis when the application program uses the UPnP devices. If the UPnP-based driver 515 finds that any remote device intends to leave the network, its corresponding virtual interface object 603 will be removed. Also, the UPnP device will be removed from the OSGi service registry 517. If the UPnP device issues an event notice, then the UPnP-based driver 515 will change or remove corresponding virtual peripheral device interface objects 603 in accordance with the content of the notice, and also remove them from the OSGi service registry 517.

Figure 7:
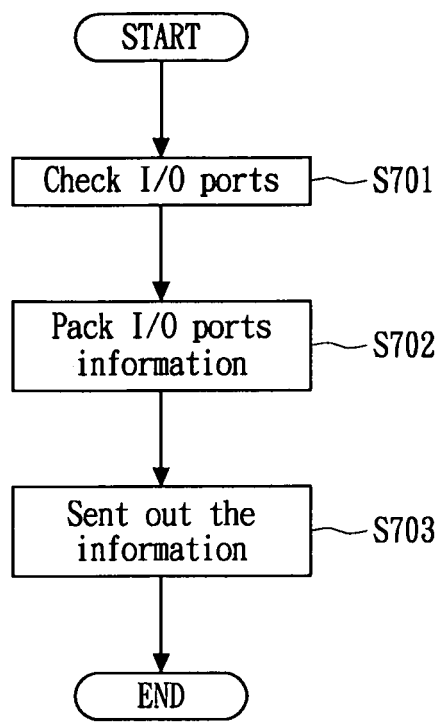
FIG. 7 is a flow chart corresponding to an interface-providing mechanism according to one embodiment of the present invention.

FIG. 7 is a flow chart corresponding to an interface-providing mechanism according to one embodiment of the present invention. At Step S701, the remote interface device will retrieve some information of its I/O ports, and also find out which ports are used and by whom. The information includes port type, multi-port identifier, etc. At Step S702, some information gathered at Step S701 will be packed in either an Internet standard format or in text format, depending on how the communication system is designed. The Internet standard format can be any Internet protocol or any protocol used to discover any available services on the Internet, like SSDP (Simple Service Discovery Protocol), or SLP (Service Location Protocol). At Step S703, the device sends out the information by Internet connection. When a host receives the information, the host sequentially sets up virtual peripheral device interface objects corresponding to the remote interface device in its virtual remote interface driver and then presents these ports to the user through the interface objects.

Figure 8:
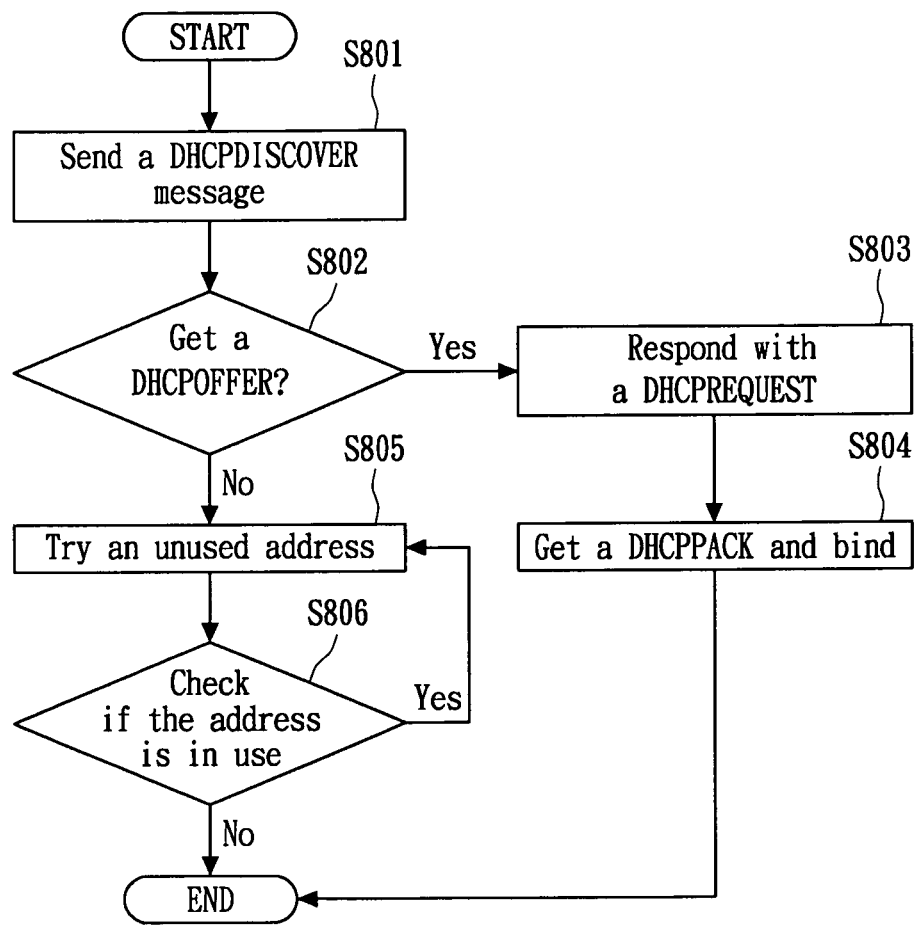
FIG. 8 is a flow chart corresponding to a network address setting mechanism according to one embodiment of the present invention.

FIG. 8 is a flow chart corresponding to network address setting mechanism according to one embodiment of the present invention. At Step S801, a remote interface device will send a DHCPDISCOVERY message, when it is connected to the Internet. At Step S802, if there is a DHCP server, the device will get DHCPOFFERS. At Step S803, when the device receive DHCPOFFERS, the device will decide from which DHCP server it will get the IP address, and then it will send a DHCPREQUEST message to the server according to the decision. At Step S804, the server will send a DHCP-PACK back to the device, and the device can start to use the IP address. At Step S805, if no DHCP server is available on the network, the device will choose an IP address in an address range, for example, in the 169.254/16 range. At Step S806, the selected address will be tested to determine if the address is already in use. If the address is in use by another device, another address will be chosen and tested, up to an implementation dependent number of retries. The network address setting mechanism can have either one or both of the two approaches described above.

Figure 9:
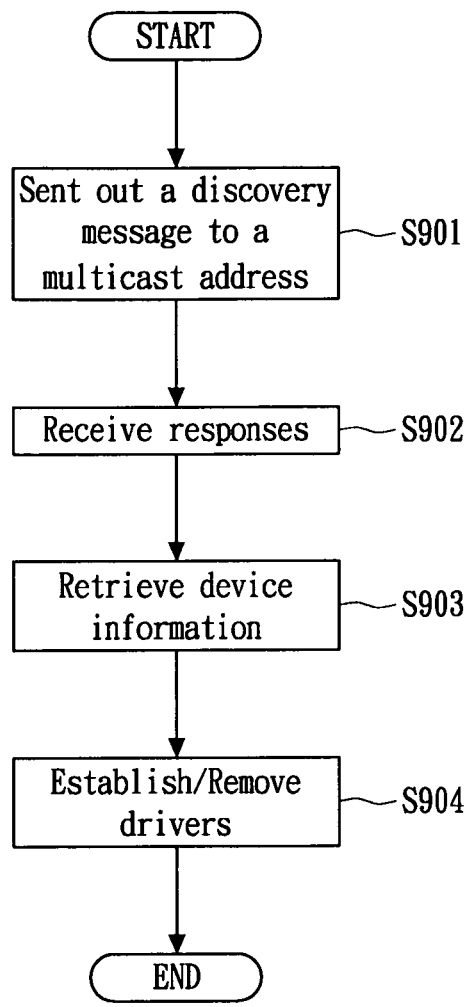
FIG. 9 is a flow chart corresponding to the discovery mechanism according to one embodiment of the present invention.

FIG. 9 is a flow chart corresponding to the discovery mechanism according to one embodiment of the present invention. At Step S901, when a host wants to know what services are available on the network, it sends out a discovery message to a multicast address, to which every device will listen. For example, under UPnP, the discovery message will be sent to the multicast address 239.255.255.250 on port via UDP protocol. This message has a header, similar to an HTTP request. At Step S902, the host will receive responses from remote interface devices on the network. The response message can be sent using a UDP unicast, and announce which profiles the device implements. At Step S903, once the host receives the response messages, the host will parse these messages. At Step S904, the host will establish the virtual peripheral device interface objects for the newly added devices, and remove the virtual peripheral device interface objects for the disconnected devices according to the response messages. The advertising mechanism is similar to the discovery mechanism except first the device sends a message to a multicast address, then hosts respond to the message.

Figure 10:
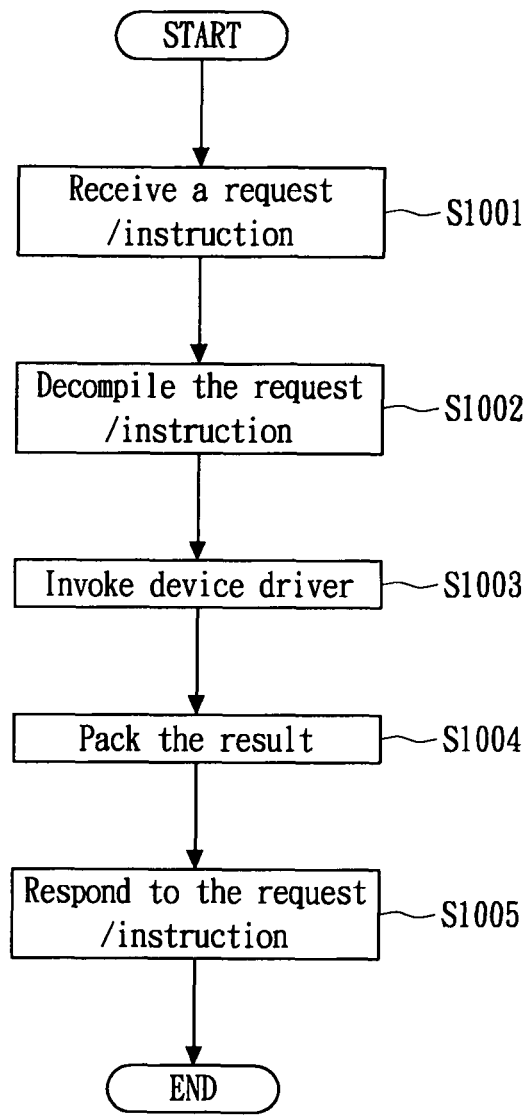
FIG. 10 is a flow chart showing the remote control according to one embodiment of the present invention.

FIG. 10 is a flow chart showing the remote control according to one embodiment of the present invention. This embodiment is corresponding to the mechanism for transferring driver instructions and the mechanism for transferring an execution result. At Step S1001, a remote interface device receives a request or instruction for a service. The request/instruction may be sent using SOAP protocol. At Step S1002, the device will decompile the request/instruction, from which the service and its parameters can be known. At Step S1003, the device will invoke the device driver corresponding to the service, and pass the parameters to it. At Step S1004, after the service finishes and has produced a result, the device will pack the result in the same format as the request. At Step S1005, the device will respond with the result to the request/instruction.

The above-described embodiments of the present invention are intended to be illustrative only. Numerous alternative embodiments may be devised by person skilled in the art without departing from the scope of the following claims.

What is claimed is:

1. A remote interface apparatus, comprising:
   a hardware network interface configured to communicate with a remote host;
   a hardware peripheral device interface configured to connect to a peripheral device;
   an interface providing mechanism cooperating with the hardware network interface to transfer the hardware peripheral device interface into a remote peripheral device connection port of the host;
   a network address setting mechanism configured to automatically obtain a network address upon a connection to the network, and to broadcast information of the hardware peripheral device interface; and
   transferring driver instructions of the peripheral device in a network protocol to a driver of the peripheral device interface; and
   transferring an execution result of the peripheral device to the host in a network protocol;
   replying to the host about status information of the peripheral device interface and/or the peripheral device; and
   transferring status information of the peripheral device interface and/or the peripheral device to the host; and
   a processor and memory for operations.

2. The remote interface apparatus of claim 1, wherein the network address setting mechanism obtains the network address through dynamic host configuration protocol (DHCP) and non-DHCP.

3. The remote interface apparatus of claim 1, further comprising an advertising mechanism configured to broadcast a device type and/or device identifier.

4. The remote interface apparatus of claim 3, further comprising a discovery mechanism configured to respond with a device type and/or device identifier upon receipt of inquiry from other devices in the network.

5. The remote interface apparatus of claim 1, wherein the network interface is TCP/IP Ethernet or wireless local area network.

6. The remote interface apparatus of claim 1, wherein the peripheral device interface is a wired network interface or short distance wireless interface.

7. The remote interface apparatus of claim 6, wherein the wired network interface is RS232, RS485, RS422 or USB interface.

8. The remote interface apparatus of claim 6, wherein the short distance wireless interface is Bluetooth, IrDA or Zigbee/802.15.4 interface.

9. A remote interface apparatus, comprising:
   a hardware network interface configured to communicate with a remote host;
   a hardware peripheral device interface configured to connect to a peripheral device;
   an interface-providing mechanism cooperating with the hardware network interface to transfer the hardware peripheral device interface into a remote peripheral device connection port of the host; and
   an information providing mechanism configured to provide information of the device interface upon receipt of a network address by advertising or discovery; and
   transferring driver instructions of the peripheral device in a network protocol to a driver of the peripheral device interface; and
   transferring an execution result of the peripheral device to the host in a network protocol;
   replying to the host about status information of the peripheral device interface and/or the peripheral device; and
   transferring status information of the peripheral device interface and/or the peripheral device to the host; and
   a processor and memory for operations.

10. The remote interface apparatus of claim 9, further comprising a network address setting mechanism that obtains the network address through DHCP.

11. The remote interface apparatus of claim 9, wherein the information providing mechanism comprises an advertising mechanism configured to broadcast a device type and/or device identifier.

12. The remote interface apparatus of claim 9, wherein the information providing mechanism comprises a discovery mechanism configured to reply with a device type and/or device identifier upon receipt of inquiry from other devices in the network.

13. The remote interface apparatus of claim 9, wherein the network interface is TCP/IP Ethernet or wireless local area network.

14. The remote interface apparatus of claim 9, wherein the peripheral device interface is a wired network interface or short distance wireless interface.

15. The remote interface apparatus of claim 14, wherein the wired network interface is an RS232, RS485, RS422 or USB interface.

16. The remote interface apparatus of claim 14, wherein the short distance wireless interface is Bluetooth, IrDA or Zigbee/802.15.4 interface.

17. A remote interface system, comprising:
a remote interface apparatus comprising:
a hardware network interface configured to communicate with a remote host;
a hardware peripheral device interface configured to connect to a peripheral device;
an interface-providing mechanism cooperating with the hardware network interface to transfer the hardware peripheral device interface into a remote peripheral device connection port of the host; and
a network address setting mechanism configured to automatically obtain a network address upon a connection to the network, and broadcast information of the hardware peripheral device interface;
a host comprising a virtual peripheral device interface object, wherein the virtual peripheral device interface object transfers driver instructions of the peripheral device in a network protocol to the remote interface apparatus, and later receives an execution result of the remote interface apparatus; and
transferring driver instructions of the peripheral device in a network protocol to a driver of the peripheral device interface; and
transferring the execution result of the peripheral device to the host in a network protocol;
replying to the host about status information of the peripheral device interface and/or the peripheral device; and
transferring status information of the peripheral device interface and/or the peripheral device to the host; and
a processor and memory for operations.

18. The remote interface apparatus of claim 17, wherein the peripheral device interface is a wired network interface or short distance wireless interface.

19. The remote interface apparatus of claim 18, wherein the wired network interface is an RS232, RS485, RS422 or USB interface.

20. The remote interface apparatus of claim 18, wherein the short distance wireless interface is a Bluetooth, IrDA or Zigbee/802.15.4 interface.

21. A method for using a remote interface system, comprising the steps of: automatically obtaining a network address by a remote interface apparatus;
broadcasting device interface services provided by the remote interface apparatus;
setting a connection between the remote interface apparatus and a host;
automatically installing a driver for a peripheral device connected to the remote interface apparatus;
setting a virtual peripheral device interface object corresponding to the peripheral device by the host; and
transferring driver instructions of the peripheral device in a network protocol to a driver of the peripheral device interface;
transferring the execution result of the peripheral device to the host in a network protocol;
replying to the host about status information of the peripheral device interface and/or the peripheral device; and
transferring status information of the peripheral device interface and/or the peripheral device to the host; and
a processor and memory for operations.

22. The method of claim 21, further comprising the steps of:
replying to the host about information of the peripheral device interface and/or the peripheral device;
accepting subscription of event notices requested by the host; and
transmitting status events or status variation events.

23. The method of claim 21, wherein the peripheral device interface is a wired network interface or short distance wireless interface.

24. The method of claim 23, wherein the wired network interface is an RS232, RS485, RS422 or USB interface.

25. The method of claim 23, wherein the short distance wireless interface is a Bluetooth, IrDA or Zigbee/802.15.4 interface.

* * * * *